3,203,906
BITUMINOUS SHIELDING COMPOSITION
Arthur Evans, Ilford, and Walter Jacob Rosenfelder, Hendon, London, England, assignors to Borax Consolidated Limited, and Berry Wiggins & Co. Limited, both of London, England, both British companies
No Drawing. Filed July 22, 1960, Ser. No. 44,540
Claims priority, application Great Britain, Aug. 10, 1959, 27,224/59
10 Claims. (Cl. 252—478)

This invention relates to bitumen compositions.

An object of the invention is to provide a bitumen composition which is suitable for use as shielding against neutrons.

A further object is to provide a bitumen composition comprising a low energy (thermal) neutron absorbent material and a carrier capable of attenuating fast or intermediate energy neutrons, suitable for use as a protective barrier or so-called biological shield in, for example, atomic power reactors or elsewhere where neutron radiation is encountered.

In the past it has generally been the practice to employ water as the carrier material in protective barriers in the form of hydraulic cements. Such cements give rise to various practical difficulties such as evaporation of water or the formation of cracks in a rigid cement mass and attempts have been made to employ bitumen as the carrier, since it is thermally stable and of an elastic nature.

In particular, attempts have been made to use a composition comprising bitumen together with a boron compound such as boron carbide or boron oxide for the attenuation and absorption of neutron radiation, but considerable difficulty has been encountered in providing a permanently uniform mixture of the components.

Attempts have also been made to use a composition comprising a borated bitumen, a heavy metal or metal compound such as galena or lead shot for the absorption of both gamma and neutron radiation but the results were unsuccessful since not only was difficulty encountered in providing a uniform mixture of the components but, in addition, it was found that the bitumen intended to disintegrate under gamma ray radiation.

The present invention is based on our discovery that a very satisfactory composition for shielding against neutrons is provided by a composition comprising a bitumen and a bitumen-soluble boron compound. Suitable boron compounds include various organic esters of boric acid. The resulting mixture presents no difficulty from the point of view of sedimentation, and can be prepared in the factory, instead of having to be mixed in situ.

We have also found that, in use, with a separate shield against gamma radiation where necessary, a composition in accordance with this invention does not suffer from disruption, since bitumen is unaffected by neutron radiation but is sensitive to gamma radiation and must be shielded therefrom. Generally, neutron absorbing materials require in themselves to be associated with a shield for gamma radiation, because of the secondary emission of gamma rays, but this does not apply to the boron compounds used in accordance with the present invention.

The term "bitumen," which is used in Europe and the United States, includes asphalt, tar and pitch, all of which are completely soluble in carbon disulfide. See Kirk-Othmer, "Encyclopedia of Chemical Technology," vol. 2, page 164 (1948). Various grades of bitumen may be used including all grades of steam distilled and blown bitumens or mixtures of the two, or fluxed bitumens, always provided that their hydrogen content by weight does not fall below 8%; preferably, the hydrogen content is at least 10% by weight. Steam distilled or straight run bitumens are the end products from the distillation of a petroleum oil, and may be obtained from the still in a wide range of grades varying from very soft to very hard. Any grade may be made softer by blending with a suitable oil, called a flux oil.

Suitable boron compounds include alkylene glycol biborates such as trihexylene glycol bi-borate, trioctylene glycol bi-borate, tributylene glycol bi-borate, and triethylene glycol bi-borate. Borates of monohydric alcohols may also be used, for example 2,6,8-trimethyl-4-nonyl borate. The amount of the ester will be related to its boron content; generally, whatever the boron compounds, it will be incorporated to give a boron content in the bituminous composition within the range of 0.75–7.5%, especially 1–5%.

Whilst in the foregoing we have described the incorporation of separate boron compounds into bitumen, we do not exclude the use of boron compounds which react chemically with the bitumen, including those forming a complex compound therewith, such as boron trifluoride.

In another aspect the invention consists in a nuclear reactor furnished with a neutron shield of a bitumen-soluble borate composition as described above. A gamma radiation shield may be provided within the neutron shield, that is to say, nearer to the radiation source. The expression "nuclear reactor" will be understood to include both atomic piles and thermonuclear reactors.

A typical neutron shield is made by blending a hard, straight-run bitumen with 10% w./w. of flux oil and incorporating 20% w./w. in the mixture of trihexylene glycol biborate (calcuated on the boron content). The ester is blended with the molten fluxed bitumen and the resulting shield material poured into the annular space between aluminium alloy shells around an atomic reactor, and allowed to set. The thickness will depend on the expected radiation intensity and may readily be calculated for any particular case.

What is claimed is:

1. A composition consisting essentially of bitumen having a hydrogen content of at least about 8 percent by weight obtained as the end product of distillation of petroleum oil and an organic ester of boric acid dissolved in said bitumen.

2. The composition of claim 1 wherein said organic ester of boric acid is an alkylene glycol biborate.

3. The composition of claim 1 wherein said organic ester of boric acid is a borate ester of a monohydric alcohol.

4. The composition of claim 1 wherein said organic ester of boric acid is trihexylene glycol biborate.

5. The composition of claim 1 wherein said organic ester of boric acid is 2,6,8-trimethyl-4-nonyl borate.

6. A composition consisting essentially of bitumen having a hydrogen content of at least 8 percent by weight obtained as the end product of distillation of petroleum oil and dissolved therein an organic ester of boric acid, said organic ester present in such amount that the total boron content of said composition is from about 0.75 to about 7.5 percent by weight.

7. The composition of claim 6 in which the total boron content is from about 1 to about 5 percent by weight.

8. The composition of claim 6 in which said organic ester of boric acid is an alkylene glycol biborate.

9. The composition of claim 6 in which said organic ester of boric acid is trihexylene glycol biborate.

10. In a bitumen radiation shield composition consisting essentially of bitumen obtained as the end product of distillation of petroleum oil and having a hydrogen content of at least about 8 percent, the improvement which consists of an organic ester of boric acid dissolved in said shield composition in an amount sufficient to provide a total boron content of from about 0.75 to about 7.5 percent by weight of said shield composition.

References Cited by the Examiner
UNITED STATES PATENTS

| | | | |
|---|---|---|---|
| 746,689 | 12/03 | Dupont-Franklin | 106—273 |
| 2,179,208 | 11/39 | Burk et al. | 106—273 |
| 2,375,117 | 5/45 | Lentz | 106—273 |
| 2,462,616 | 2/49 | Eby et al. | 260—462 |
| 2,508,428 | 5/50 | Smith et al. | 106—273 |
| 2,508,924 | 5/50 | Mertens et al. | 260—462 |
| 2,796,411 | 6/57 | Zirkle. | |
| 2,796,529 | 6/57 | Morrison | 176—40 X |
| 2,807,727 | 9/57 | Fermi et al. | 176—40 X |
| 2,961,415 | 11/60 | Axelrad | 176—88 X |

OTHER REFERENCES

Jaske, Asphalt as a Shielding Medium (AECD–3942), Sept. 1949, pages 1, 2, and 4. USAEC document.

Turner, The Condensed Chemical Dictionary, April 1957, pages 159–160, 168, 245, 528, 731, 813, and 822.

Rockwell, Reactor Shielding Design Manual, Nov. 1956, McGraw-Hill, pages 175–177.

CARL D. QUARFORTH, *Primary Examiner.*

ROGER L. CAMPBELL, OSCAR R. VERTIZ, REUBEN EPSTEIN, *Examiners.*